(12) United States Patent
Lan

(10) Patent No.: US 9,534,962 B2
(45) Date of Patent: Jan. 3, 2017

(54) TEMPERATURE MEASUREMENT DEVICES

(75) Inventor: Kuo-Jung Lan, Jhonghe (TW)

(73) Assignee: MEDIATEK INC., Hsin-Chu (TW)

( * ) Notice: Subject to any disclaimer, the term of this patent is extended or adjusted under 35 U.S.C. 154(b) by 687 days.

(21) Appl. No.: 12/838,751

(22) Filed: Jul. 19, 2010

(65) Prior Publication Data

US 2012/0016610 A1    Jan. 19, 2012

(51) Int. Cl.

| | | |
|---|---|---|
| G01K 1/00 | (2006.01) | |
| G01K 3/00 | (2006.01) | |
| G01K 7/00 | (2006.01) | |
| G01K 13/00 | (2006.01) | |
| G01K 17/00 | (2006.01) | |
| G01K 7/24 | (2006.01) | |

(52) U.S. Cl.
CPC ............. *G01K 7/24* (2013.01); *G01K 3/005* (2013.01)

(58) Field of Classification Search
CPC ............ G01K 3/005; G01K 7/24; G01K 7/42; G01K 15/00; G01K 1/026; G06F 1/206
USPC ........................................................ 702/130
See application file for complete search history.

(56) References Cited

U.S. PATENT DOCUMENTS

| | | | | |
|---|---|---|---|---|
| 4,102,199 A | * | 7/1978 | Tsipouras | G01K 1/026 374/167 |
| 5,991,700 A | * | 11/1999 | Clay et al. | 702/131 |
| 6,115,441 A | * | 9/2000 | Douglass et al. | 377/25 |
| 6,309,099 B1 | * | 10/2001 | Chang | G06F 1/206 374/183 |
| 6,404,610 B1 | | 6/2002 | Chang | |
| 6,890,097 B2 | * | 5/2005 | Tanaka | G01K 15/005 374/163 |
| 6,928,379 B2 | * | 8/2005 | Fulton et al. | 702/130 |
| 7,460,973 B2 | * | 12/2008 | Kobayashi et al. | 702/133 |
| 2007/0008046 A1 | * | 1/2007 | Godambe | H03H 11/1291 331/135 |
| 2008/0128277 A1 | * | 6/2008 | Fukuda | G01N 27/4175 204/401 |
| 2008/0191794 A1 | * | 8/2008 | Chiu | H03H 11/1291 327/553 |
| 2008/0238357 A1 | * | 10/2008 | Bourilkov et al. | 320/106 |
| 2009/0281760 A1 | * | 11/2009 | Taylor | 702/130 |

FOREIGN PATENT DOCUMENTS

CN    1153052    6/2004

OTHER PUBLICATIONS

Partial English language translation of CN 1153052 (published Jun. 9, 2004).

* cited by examiner

*Primary Examiner* — Michael Nghiem

(74) *Attorney, Agent, or Firm* — McClure, Qualey & Rodack, LLP

(57) ABSTRACT

A temperature measurement device is provided to measure an environment temperature and includes a thermistor, a resistor, a determination circuit, and a measurement circuit. The thermistor is coupled to a first node. The thermistor has a specific impedance value at a specific environment temperature point. The resistor has a first terminal coupled to the first node. The determination circuit determines a real impedance value of the resistor. The measurement circuit is coupled to the first node for receiving a measurement value signal generated at the first node and obtains a value of the specific environment temperature point according to the measurement value signal and the real impedance value of the resistor.

13 Claims, 15 Drawing Sheets

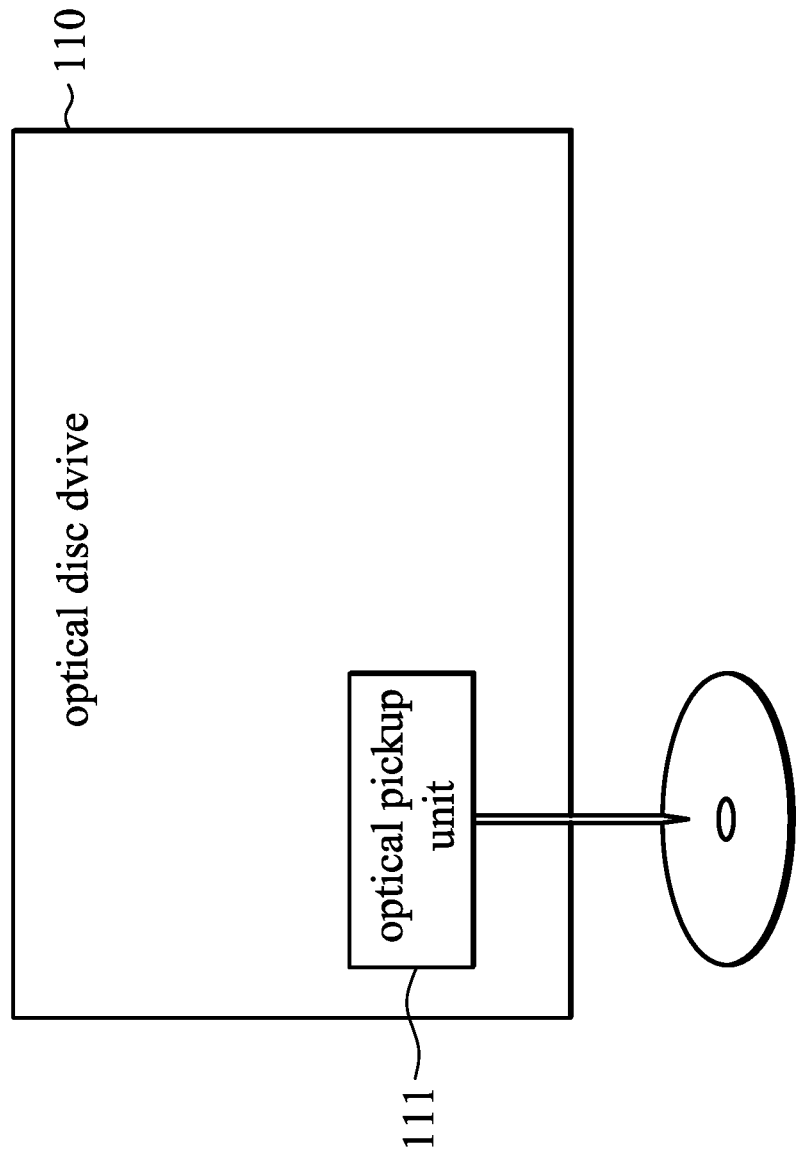

TEMPERATURE MEASUREMENT DEVICES

BACKGROUND OF THE INVENTION

Field of the Invention

The invention relates to a temperature measurement device, and more particularly, to a temperature measurement device for optical pickup units (OPUs) of optical disc drives.

Description of the Related Art

In optical disc drives, an environment temperature of the optical pickup units influences recording and/or reading operations. For example, for a DVD-RW drive, the characteristics of a Laser Diode (LD) varies with temperature, and thus a temperature surrounding the LD of an optical pickup unit is detected to adjust the write strategy or recording power when writing data to the DVD. Moreover, for a blue-ray disc (BD) drive, the focus offset for recording and reading a BD varies with temperature, and thus an environment temperature of an optical pickup unit is detected to adjust a position of a lens.

FIG. 1 shows a conventional temperature measurement device for an optical disc drive. Referring to FIG. 1, a temperature measurement device 1 comprises an integrated circuit (IC) 10, a resistor 11, a thermistor 12 and a capacitor 13. The resistor 11, the thermistor 12, and the capacitor 13 are external to the IC 10 and on a printed circuit board (PCB). The thermistor 12 is disposed near an optical pickup unit (OPU) of the optical disc drive, and the impedance value of the thermistor 12 varies with variation of the environment temperature of the OPU. Thus, a divided voltage generated at the connection node between the resistor 11 and the thermistor 12 also varies with the variation of the environment temperature of the OPU. The IC 10 can obtain the current value of the environment temperature of the OPU according to the divided voltage. However, the external resistor increases total cost of the optical disc drive.

Thus, a new temperature measurement device is provided at a low cost, particularly for an optical disc drive, which can measure an environment temperature.

BRIEF SUMMARY OF THE INVENTION

An exemplary embodiment of a temperature measurement device is used to measure an environment temperature and comprises a thermistor, a resistor, a determination circuit, and a measurement circuit. The thermistor is coupled to a first node. The thermistor has a specific impedance value at a specific environment temperature point. The resistor has a first terminal coupled to the first node. The determination circuit determines a real impedance value of the resistor. The measurement circuit is coupled to the first node. The measurement circuit receives a measurement value signal generated at the first node and obtains a value of the specific environment temperature point according to the measurement value signal and the real impedance value of the resistor.

In an embodiment, the resistor has a theoretical impedance value and further has a second terminal coupled to a voltage source, and the measurement circuit comprises a calculation unit. The calculation unit calculates the value of the specific environment temperature point by applying the measurement value signal, the real impedance value and the theoretical impedance value of the resistor, and a voltage value of the voltage source in a predetermined formula.

In another embodiment, the measurement circuit comprises a compensation unit. The compensation unit determines an offset and/or a gain according to the real impedance value of the resistor and compensates the measurement value signal by the offset and/or the gain to obtain the value of the specific environment temperature point.

In another embodiment, the measurement circuit comprises a lookup table and processing unit. The lookup table stores a plurality of temperature values corresponding to various signal magnitudes and various impedance values. The processing unit looks up one temperature value of the temperature values from the lookup table according to a magnitude of the measurement value signal and the real impedance value of the resistor to serve as the value of the specific environment temperature point.

Another exemplary embodiment of a temperature measurement device is used to measure an environment temperature and comprises a thermistor, a current source, a lookup table, and a processing circuit. The thermistor is coupled to a first node. The thermistor has a specific impedance value at a specific environment temperature point. The current source provides a current to the first node. A measurement value signal is generated at the first node according to the specific impedance value of the thermistor. The lookup table is used to store a plurality of temperature values corresponding to various signal magnitudes. The processing circuit looks up one temperature value of the temperature values from the lookup table according to a magnitude of the measurement value signal to serve as a value of the specific environment temperature point.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 11 shows an optical disc drive, wherein an environment temperature of an optical pickup unit in the optical disc drive can be measured by the temperature measurement devices in FIG. 2 and FIG. 9.

DETAILED DESCRIPTION OF THE INVENTION

Figure 1:
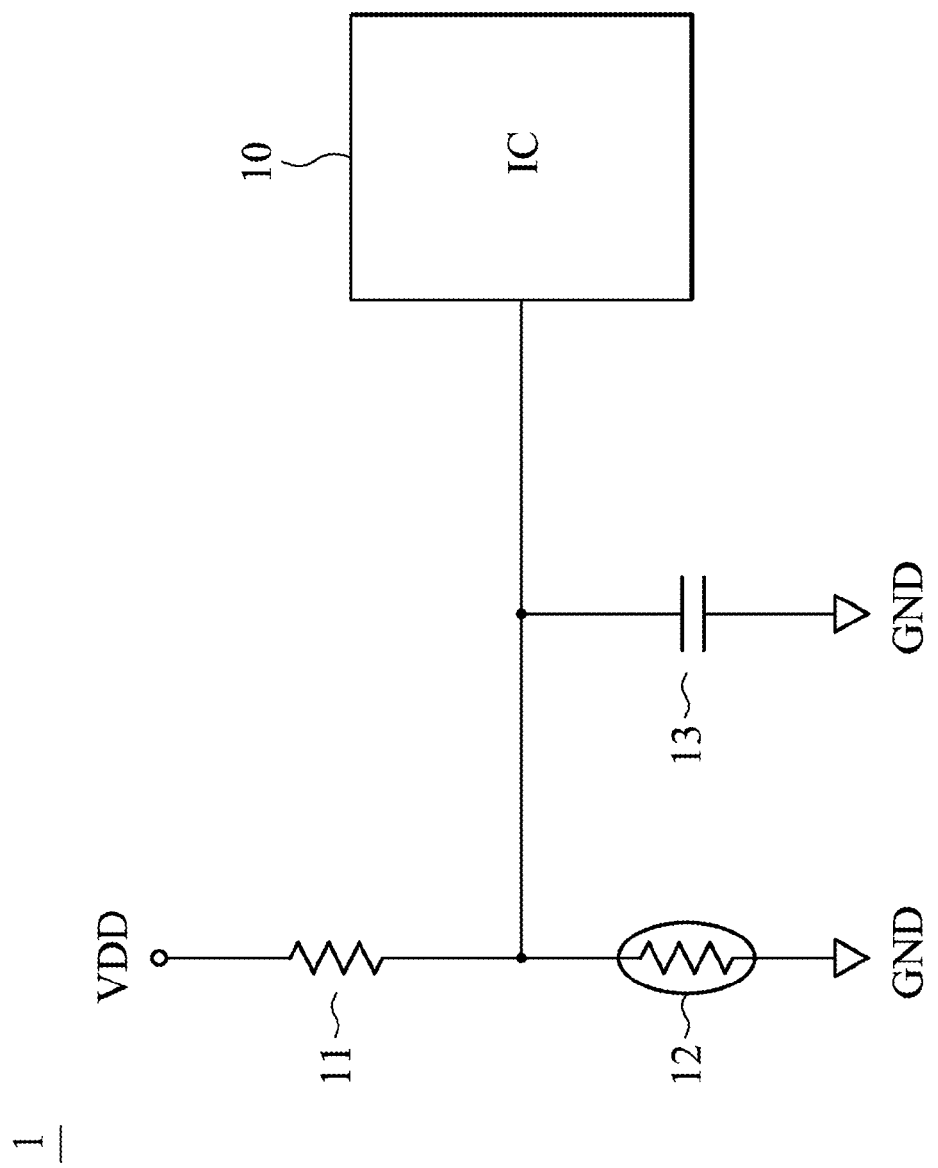
FIG. 1 shows a conventional temperature measurement device for an optical disc drive.

The following description is of the best-contemplated mode of carrying out the invention. This description is made for the purpose of illustrating the general principles of the invention and should not be taken in a limiting sense. The scope of the invention is best determined by reference to the appended claims.

Temperature measurement devices are provided. In an exemplary embodiment of a temperature measurement device in FIG. 2, a temperature measurement device 2 is used to measure an environment temperature and comprises a thermistor 20, a resistor 21, a determination circuit 22, and a measurement circuit 23. The temperature measurement device 2 can measure an environment temperature of an optical pickup unit 111 in an optical disc drive 110 in FIG. 11. The thermistor 20 is coupled between a node N20 and a ground GND. The impedance value of the thermistor 20 varies with variation of the environment temperature. The resistor 21 is coupled between a voltage source VDD and the node N20. In the embodiment, the resistor 21, the determination circuit 22, and the measurement circuit 23 are integrated into an integrated circuit (IC). In other words, the resistor 21, the determination circuit 22, and the measurement circuit 23 are in a single chip 24.

As described above, the resistor 21 is in the chip 24 and can be manufactured together with the remaining portion of the chip 24. Thus, the impedance value of the resistor 21 may vary with the process variation of the chip 24. For example, for a resistor 21 desired to have a theoretical impedance value R21 of 10K ohm, the real impedance value R21' of the resistor 21 may vary between plus or minus 20% of 10K ohm due to process variations of the chip 24.

Figure 2:
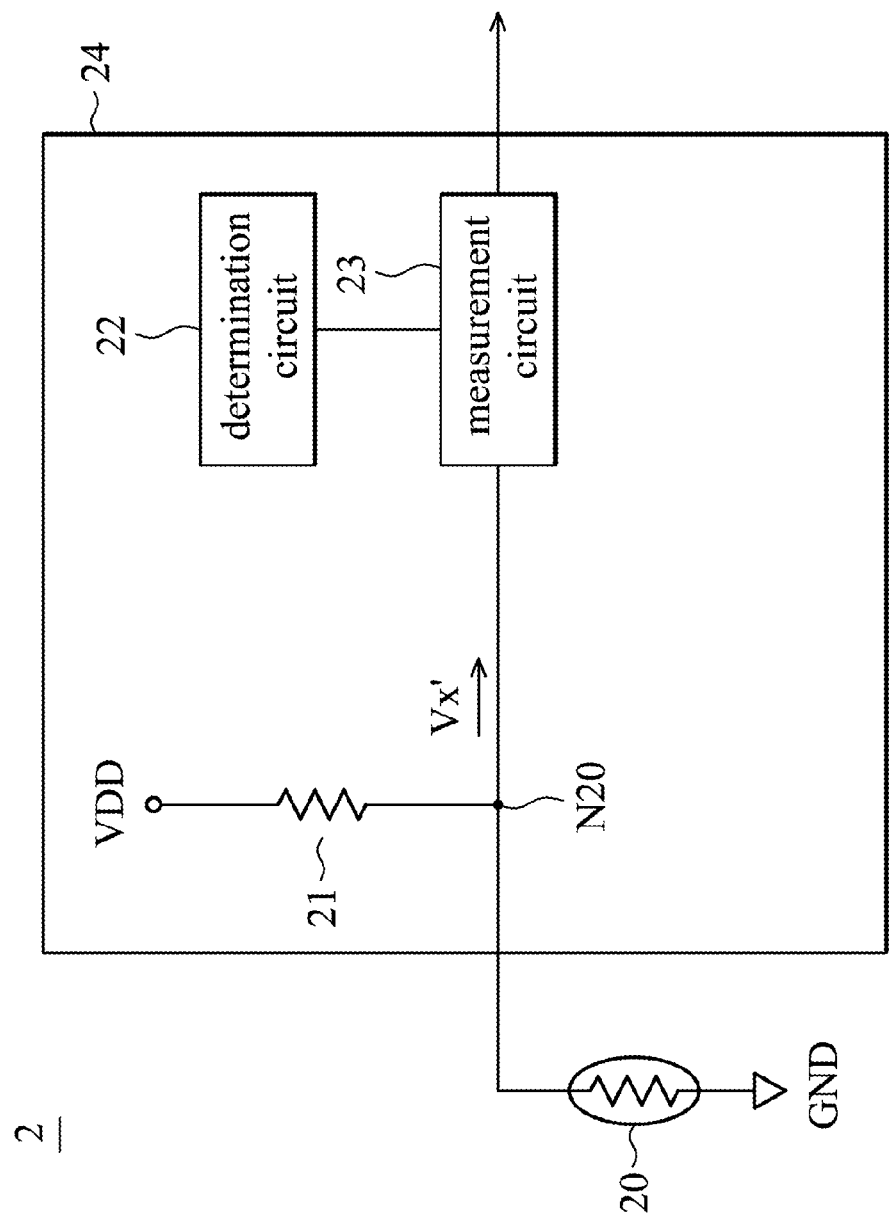
FIG. 2 shows an exemplary embodiment of a temperature measurement device.

At a specific environment temperature point, the thermistor 20 has a specific impedance value R20. Referring to FIG. 2, according to the voltage division theorem, a measurement value signal Vx' is generated at the node N20 according to the specific impedance value R20 of the thermistor 20 and the real impedance value R21' of the resistor 21. In other words, the measurement value signal Vx' is related to the specific impedance value R20 of the thermistor 20 and the real impedance value R21' of the resistor 21. As described above, since the real impedance value R21' of the resistor 21 may be not equal to the theoretical impedance value R21 due to the process variation of the chip 24, the temperature point value obtained according to the measurement value signal Vx' without consideration to the variation of the impedance value of the resistor 21 may not be the value of the specific environment temperature point. Thus, in the embodiment, the determination circuit 22 is provided to determine the real impedance value R21' of the resistor 21, and the determined real impedance value R21' of the resistor 21 can serve as a factor for obtaining the value of the specific environment temperature point.

Referring to FIG. 2, the value of the specific environment temperature point is determined by the measurement circuit 23. The measurement circuit 23 is coupled to the node N20 to receive the measurement value signal Vx' generated at the specific environment temperature point. The measurement circuit 23 is further coupled to the determination circuit 22 to receive the real impedance value R21' of the resistor 21. Accordingly, the measurement circuit 23 obtains the value of the specific environment temperature point according to the measurement value signal Vx' and the real impedance value R21' of the resistor 21.

Figure 3:
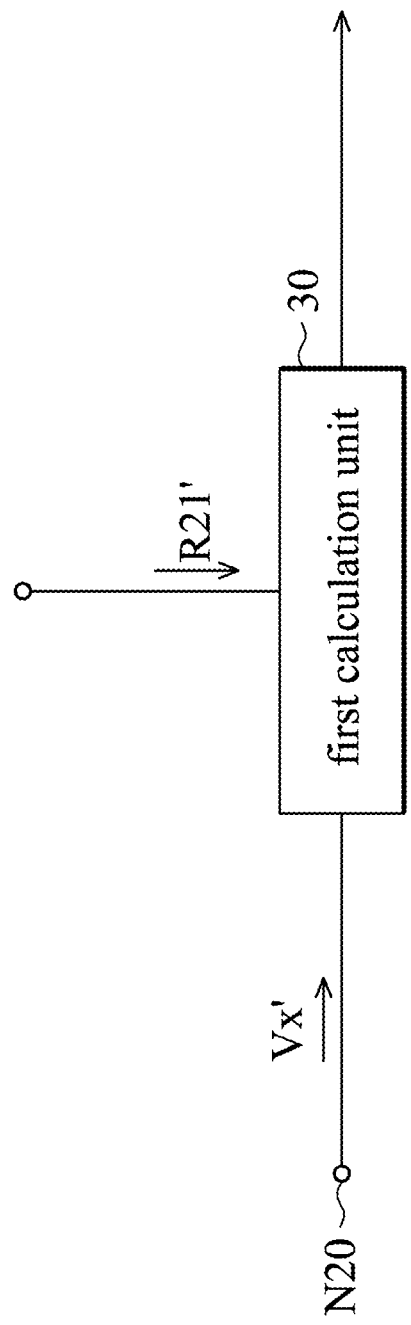
FIG. 3 shows an exemplary embodiment of a measurement circuit of FIG. 2.

FIG. 3 shows an exemplary embodiment of the measurement circuit 23 of FIG. 2. Referring to FIG. 3, the measurement circuit 23 comprises a first calculation unit 30. The first calculation unit 30 may have a predetermined formula and may calculate the value of the specific environment temperature point by applying the measurement value signal Vx', the real impedance value R21' of the resistor 21, the theoretical impedance value R21 of the resistor 21, and a voltage value vdd of the voltage source VDD in the predetermined formula. The predetermined formula will be described in the following.

Referring to FIG. 2, assume that the impedance value of the resistor 21 does not vary with the process variation of the chip 24. That is, the impedance value of the resistor 21 is substantially equal to the theoretical impedance value R21. Thus, at the specific environment temperature point, according to the voltage division theorem, a measurement value signal Vx which is generated at the node N20 and indicates value of the specific environment temperature point, is represented as:

$$Vx = Vdd \times \frac{R20}{R21 + R20} \qquad \text{Formula (1)}$$

When the impedance value of the resistor 21 varies with the process variation of the chip 24, the impedance value of the resistor 21 becomes the real impedance value R21'. At the specific environment temperature point, according to the voltage division theorem, the measurement value signal Vx' generated at the node N20 is represented as:

$$Vx' = Vdd \times \frac{R20}{R21' + R20} \qquad \text{Formula (2)}$$

From Formula (2), the Formula (1) is rewritten as:

$$Vx = Vdd \times \frac{\frac{R21' \times Vx'}{Vdd - Vx'}}{R21 + \frac{R21' \times Vx'}{Vdd - Vx'}} \qquad \text{Formula (3)}$$

The Formula (3) is expanded to be:

$$Vx = \frac{Vdd \times R21' \times Vx'}{Vdd \times R21 + (R21' - R21) \times Vx'} \qquad \text{Formula (4)}$$

In the embodiment, the Formula (4) serves as the predetermined formula for obtaining the value of the specific environment temperature point. The first calculation unit 30 applies the measurement value signal Vx', the real impedance value R21' of the resistor 21, the theoretical impedance value R21 of the resistor 21, and the voltage value vdd of the voltage source VDD in the predetermined Formula (4) to obtain the measurement value signal Vx. Then the value of the specific environment temperature point can be obtained according to the value of the measurement value signal Vx and the characteristics of the thermistor 20.

Figure 4:
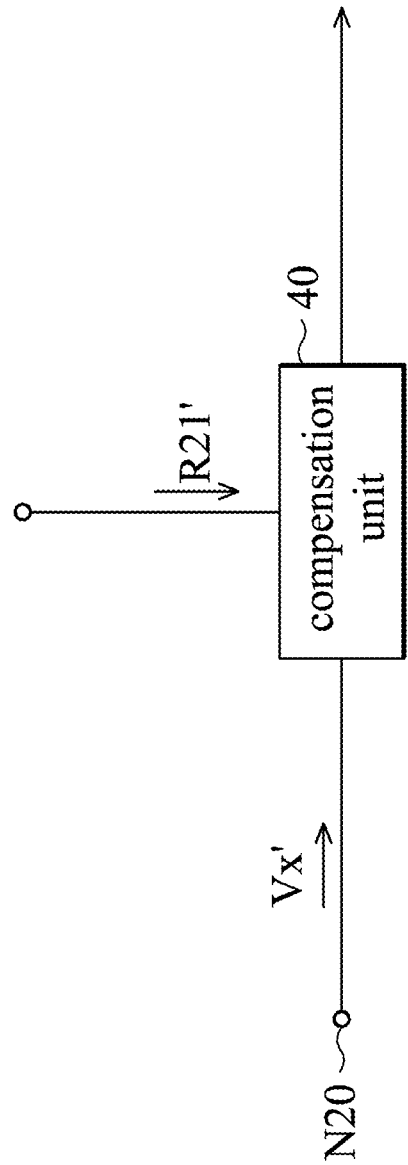
FIG. 4 shows another exemplary embodiment of a measurement circuit of FIG. 2.

FIG. 4 shows another exemplary embodiment of the measurement circuit 23 of FIG. 2. Referring to FIG. 4, the measurement circuit 23 comprises a compensation unit 40. The compensation unit 40 is coupled to the determination circuit 22 and obtains the real impedance value R21' of the resistor 21. The compensation unit 40 determines an offset and/or a gain according to the real impedance value R21' of the resistor 21. The compensation unit 40 is further coupled to the node N20 to receive the measurement value signal Vx'. The compensation unit 40 compensates the measurement value signal Vx' by the offset and/or the gain to obtain the value of the specific environment temperature point.

Figure 5:
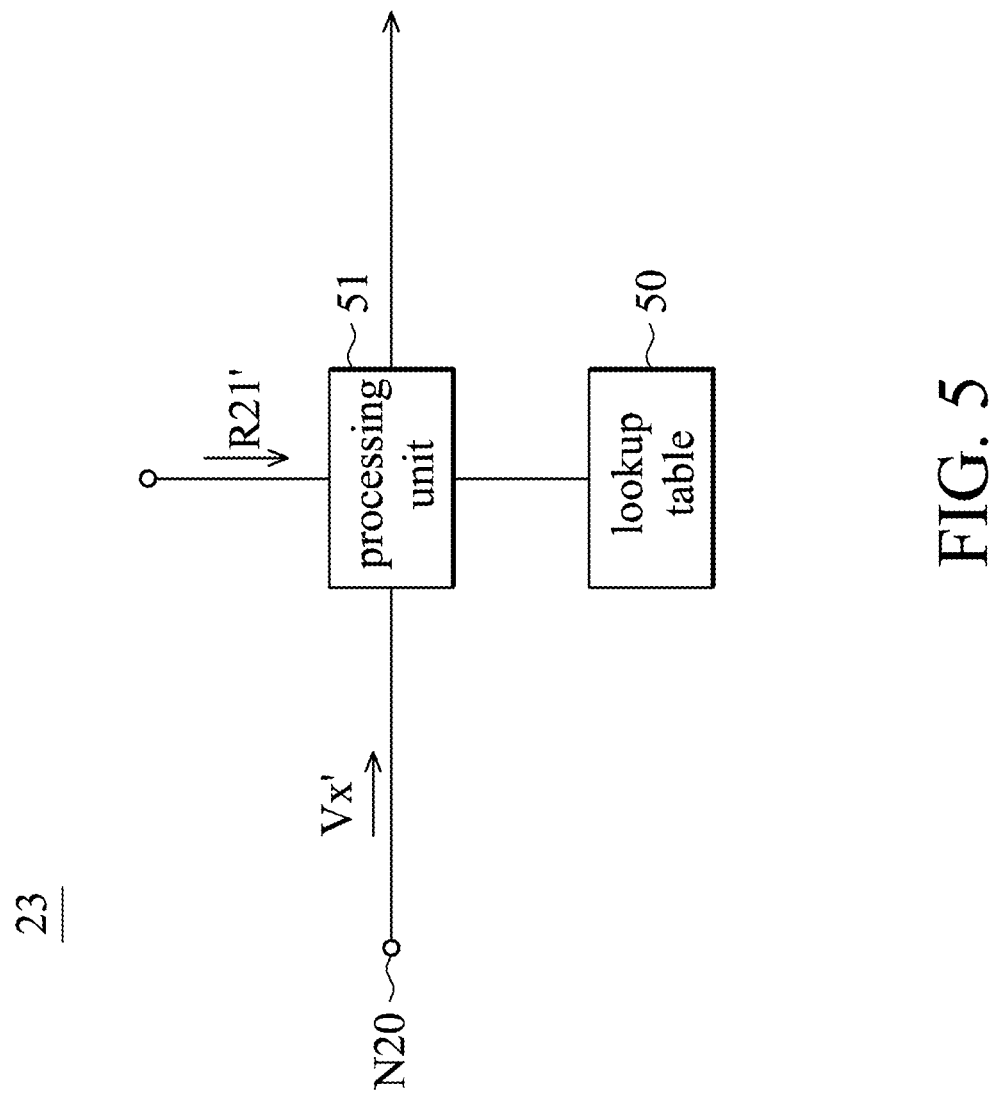
FIG. 5 shows another exemplary embodiment of a measurement circuit of FIG. 2.

FIG. 5 shows another exemplary embodiment of the measurement circuit 23 of FIG. 2. The measurement circuit 23 comprises a lookup table 50 and a processing unit 51. The lookup table 50 can be a two-dimensional table for storing a plurality of temperature values which correspond to various signal magnitude and various impedance values. The processing unit 51 is coupled to the node N20 to receive the measurement value signal Vx'. The processing unit 51 looks up one temperature value among the temperature values from the lookup table 50 according to the magnitude of the measurement value signal Vx' and the real impedance value R21' of the resistor 21 to serve as the value of the specific environment temperature point.

According to the above embodiment of FIG. 2, the resistor 21 is in the chip 24, and the impedance value of the resistor 21 may vary with the process variation of the chip 24. When the impedance value of the resistor 21 varies with the process variation of the chip 24, the temperature point value obtained according to the measurement value signal Vx' without consideration to the variation of the impedance value of the resistor 21 may not be the value of the specific environment temperature point. However, according to the embodiment, the determination circuit 22 can determine the real impedance value R21' of the resistor 21, and the measurement circuit 23 can obtain the value of the specific environment temperature point according to the measurement value signal Vx' and real impedance value R21' of the resistor 21 by using a predetermined formula, performing offset and/or gain compensation, or referring to a lookup table. Thus, the value of the specific environment temperature point can be obtained by an IC (that is the chip 24) without influence of the process variation. Moreover, since there is no external resistor disposed outside of the chip 24, the cost of the temperature measurement device 2 is less than conventional devices.

Figure 6A:
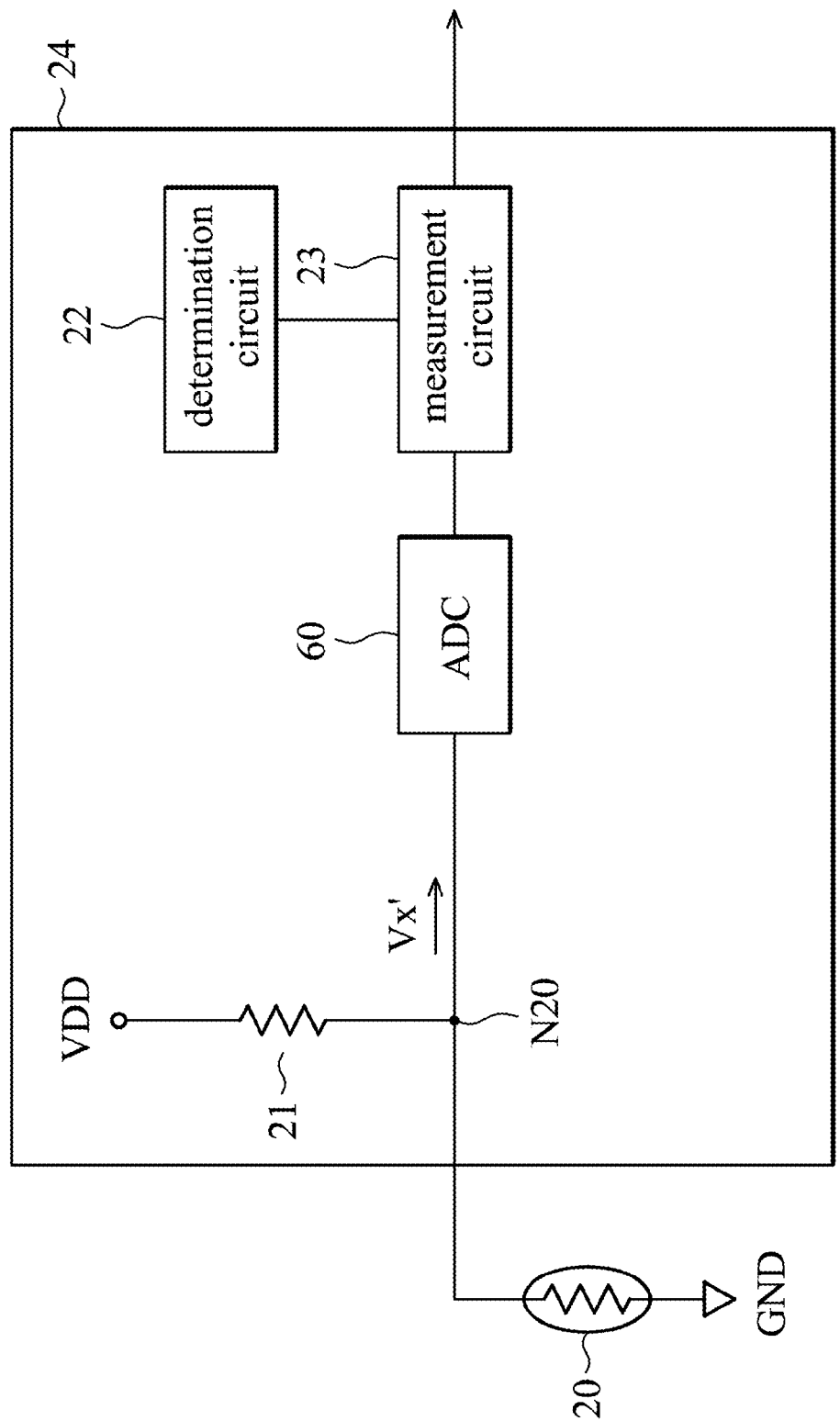
FIGS. 6A~6C show other exemplary embodiments of a temperature measurement device.

In some embodiments, the temperature measurement device 2 further comprises an analog-to-digital conversion (ADC) circuit. As shown in FIG. 6A, an ADC circuit 60 is coupled between the node N20 and the measurement circuit 23. The ADC circuit 60 receives the measurement value signal Vx' generated at the specific environment temperature point and digitizes the measurement value signal Vx'. The ADC circuit 60 then outputs the digitized measurement value signal Vx' to the measurement circuit 23 to obtain the value of the specific environment temperature point in a digital manner. In the embodiment of FIG. 6A, the ADC circuit 60 is in the chip 24.

Figure 6B:
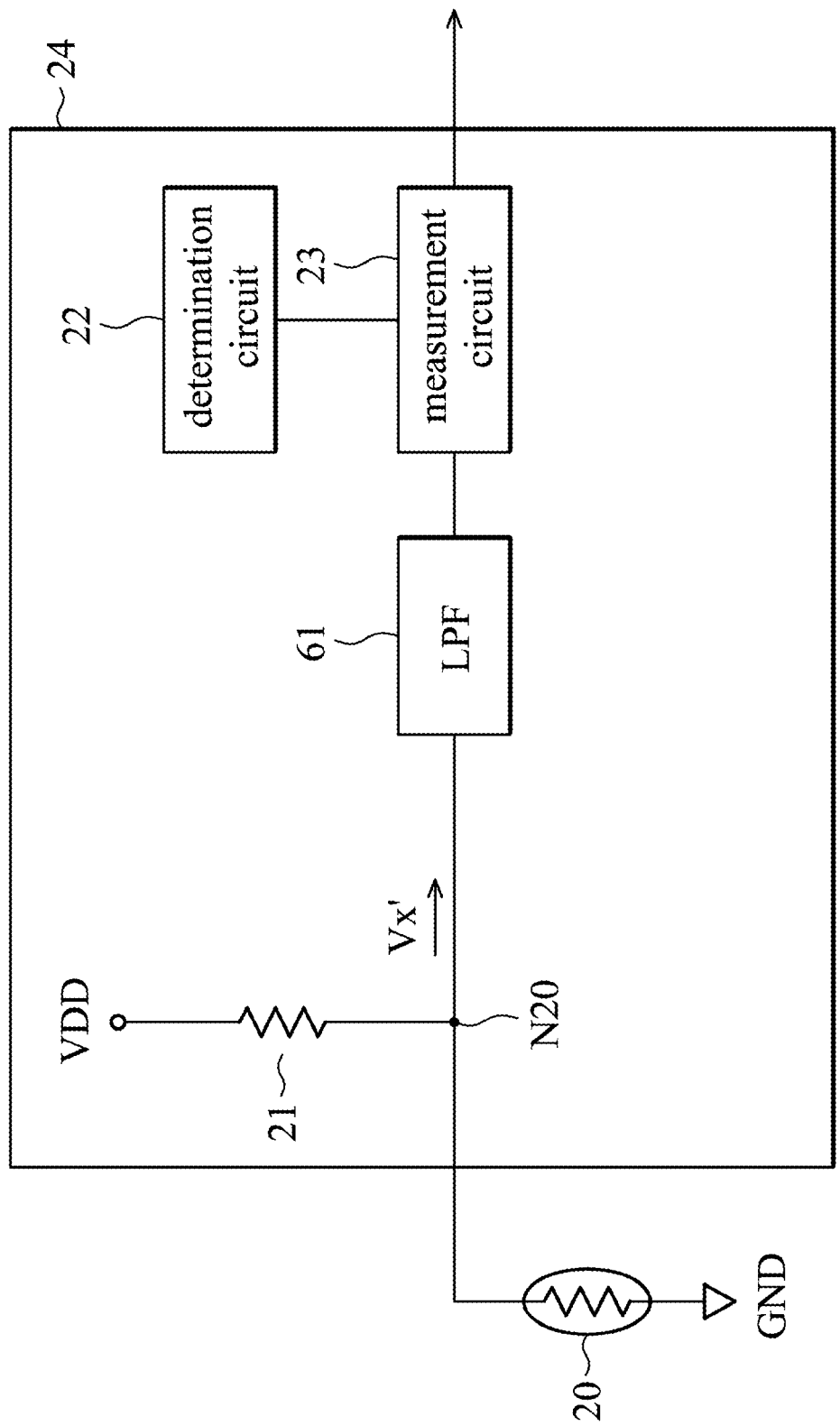

In some other embodiments, the temperature measurement device 2 further comprises a low pass filter (LPF) circuit. As shown in FIG. 6B, an LPF circuit 61 is coupled between the node N20 and the measurement circuit 23. The LPF circuit 61 receives the measurement value signal Vx' generated at the specific environment temperature point and filters the measurement value signal Vx' by removing high frequency components. The LPF circuit 61 then outputs the filtered measurement value signal Vx' to the measurement circuit 23 to more accurately obtain the value of the specific environment temperature point. In the embodiment of FIG. 6B, the LPF circuit 61 is in the chip 24.

Figure 6C:
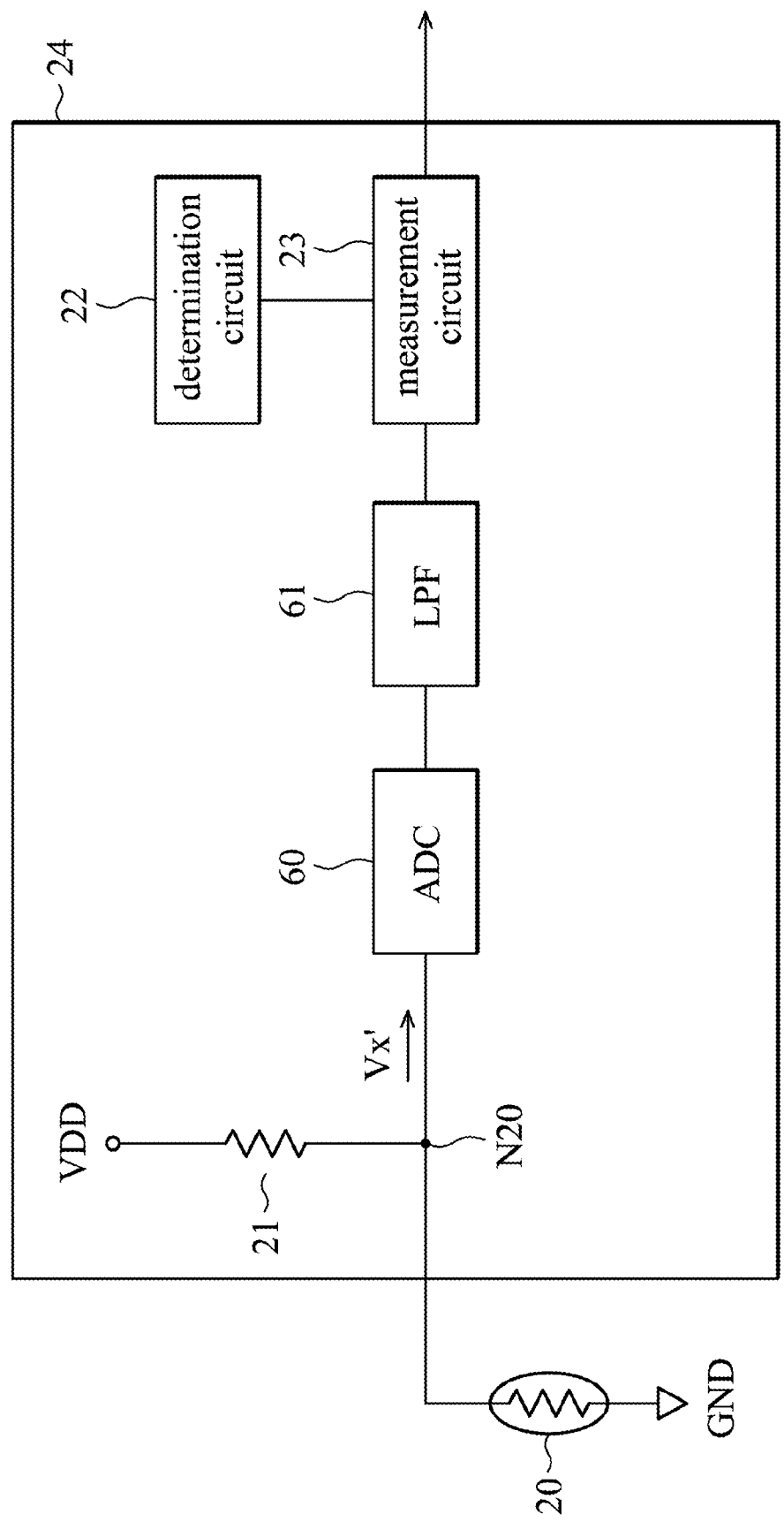

In some other embodiments, the measurement value signal Vx' can be digitized and filtered and then provided to the measurement circuit 23. As shown in FIG. 6C, the ADC circuit 60 is coupled to the node N20 to receive and digitize the measurement value signal Vx'. The LPF circuit 61 is coupled to the ADC circuit 60 to receive and filter the digitized measurement value signal Vx'. The measurement circuit 23 receives the digitized and filtered measurement value signal Vx' to obtain the value of the specific environment temperature point. The order of the ADC circuit 60, the LPF circuit 61 and the measurement circuit 23 is not limited to the embodiment shown in FIG. 6C. For example, the measurement value signal Vx' can be filtered and then digitized. In the embodiment of FIG. 6C, the ADC circuit 60 and the LPF circuit 61 are both in the chip 24.

Figure 7:
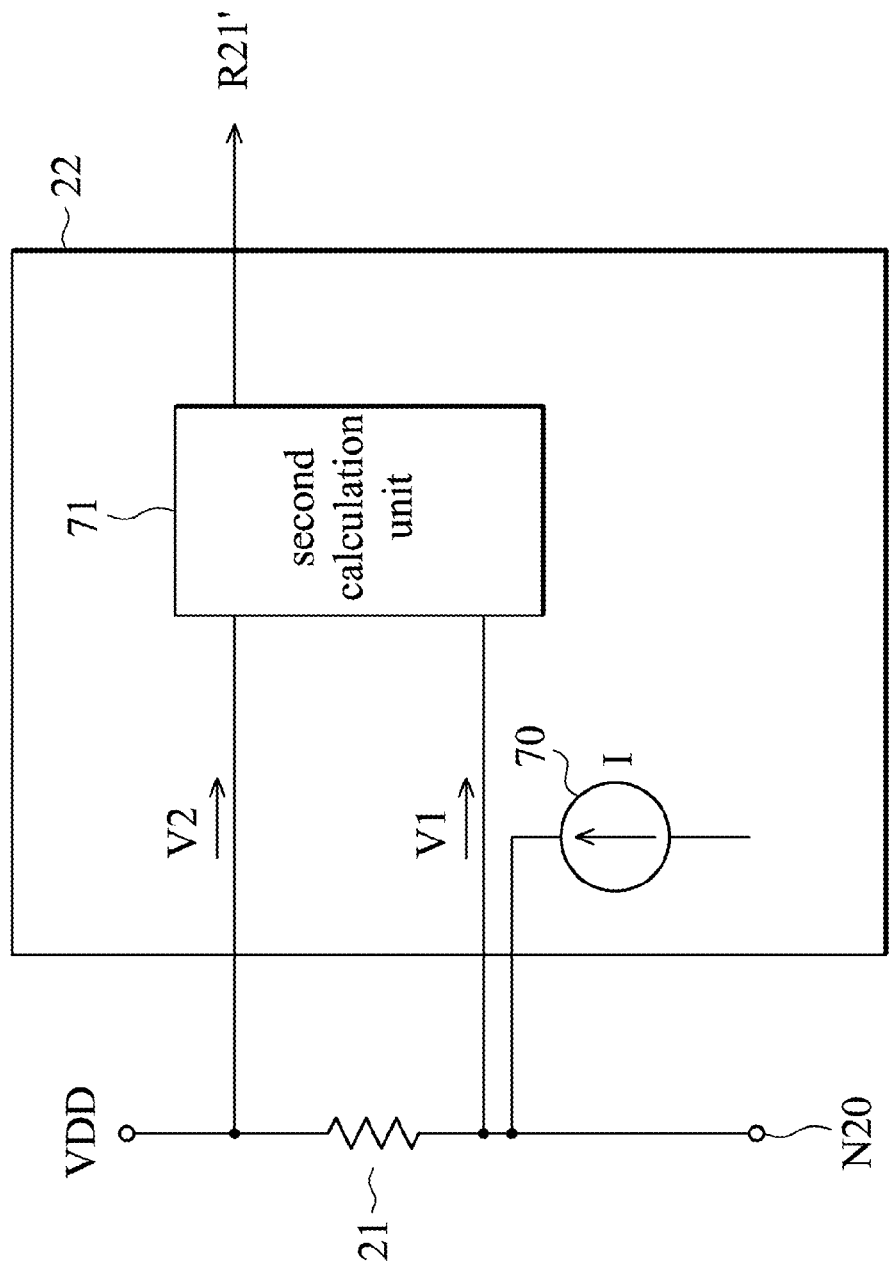
FIG. 7 shows an exemplary embodiment of a determination circuit of FIGS. 2 and 6A~6C.

FIG. 7 shows an exemplary embodiment of the determination circuit 22 of FIGS. 2 and 6A~6C. Referring to FIG. 7, the determination circuit 22 comprises a current source 70 and a second calculation unit 71. The current source 70 is coupled to a first terminal of the resistor 21 and provides a current I to the resistor 21. The value of the current I can be a constant. The second calculation unit 71 is coupled to the first and second terminals of the resistor 21. When the current source 70 provides the current I to the resistor 21, the first and second terminals of the resistor 21 have corresponding voltages. Thus, when the current source 70 provides the current I to the resistor 21, the second calculation unit 71 detects the voltage V1 of the first terminal and f the voltage V2 of the second terminal. The second calculation 71 calculates the real impedance value R21' of the resistor 21 according to the current I and the voltage signals V1 and V2, as shown in the Formula (5):

$$R21' = \frac{V1 - V2}{I} \qquad \text{Formula (5)}$$

The second calculation unit 71 provides the real impedance value R21' of the resistor 21 to the measurement circuit 23 to obtain the value of the specific environment temperature point.

Figure 8:
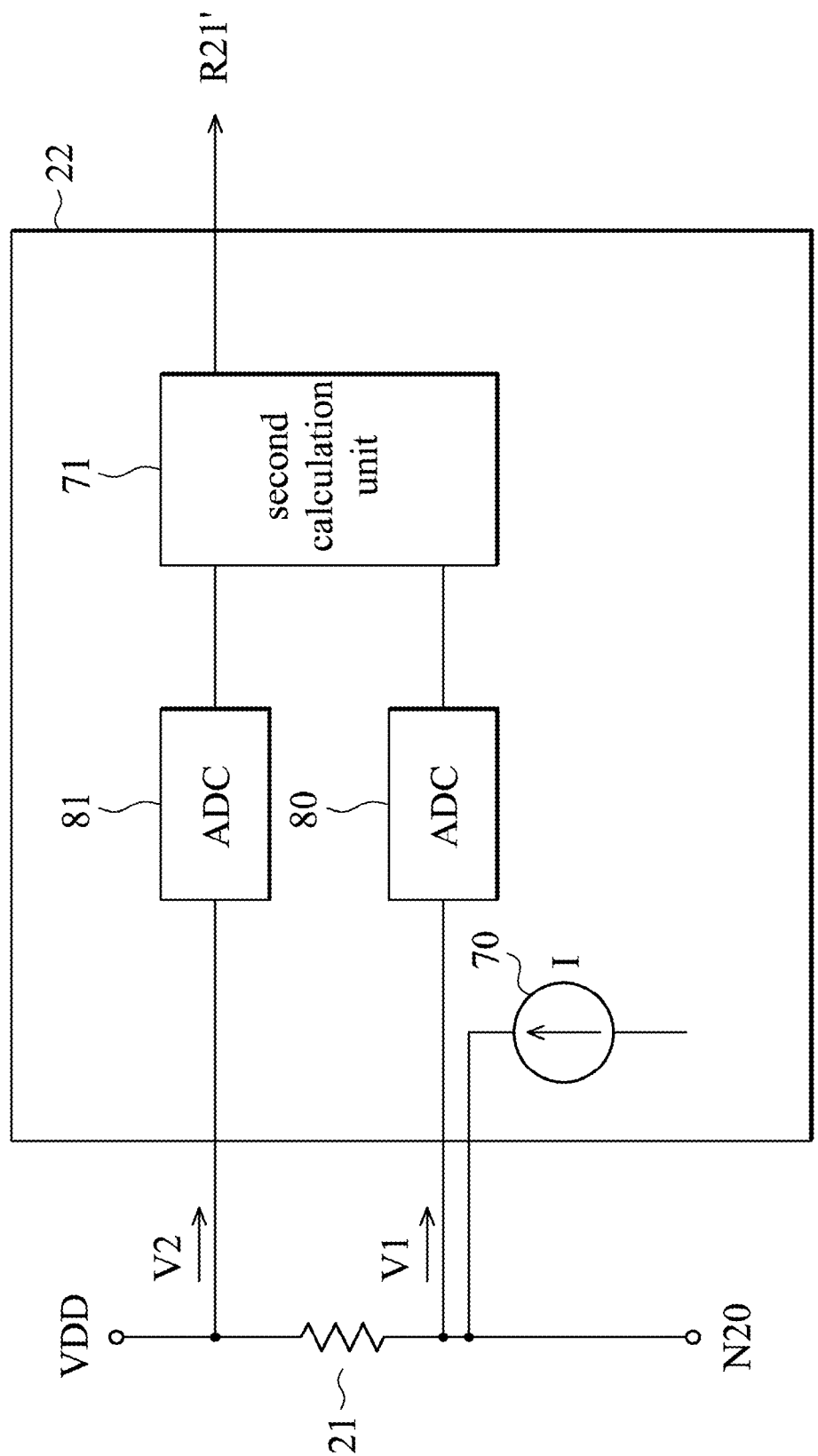
FIG. 8 shows another exemplary embodiment of a determination circuit of FIGS. 2 and 6A~6C.

In some embodiments, the determination circuit 22 further comprises ADC units 80 and 81, as shown in FIG. 8. The ADC unit 80 is coupled to the first terminal of the resistor 21, while the ADC unit 81 is coupled to the second terminal of the resistor 21. The ADC unit 80 digitizes the voltage V1 signal and outputs the digitized voltage V1 to the second calculation unit 71. The ADC unit 81 digitizes the voltage V2 and outputs the digitized voltage V2 to the second calculation unit 71. Accordingly, the second calculation unit 71 calculates the real impedance value R21' of the resistor 21 in a digital manner.

Figure 9:
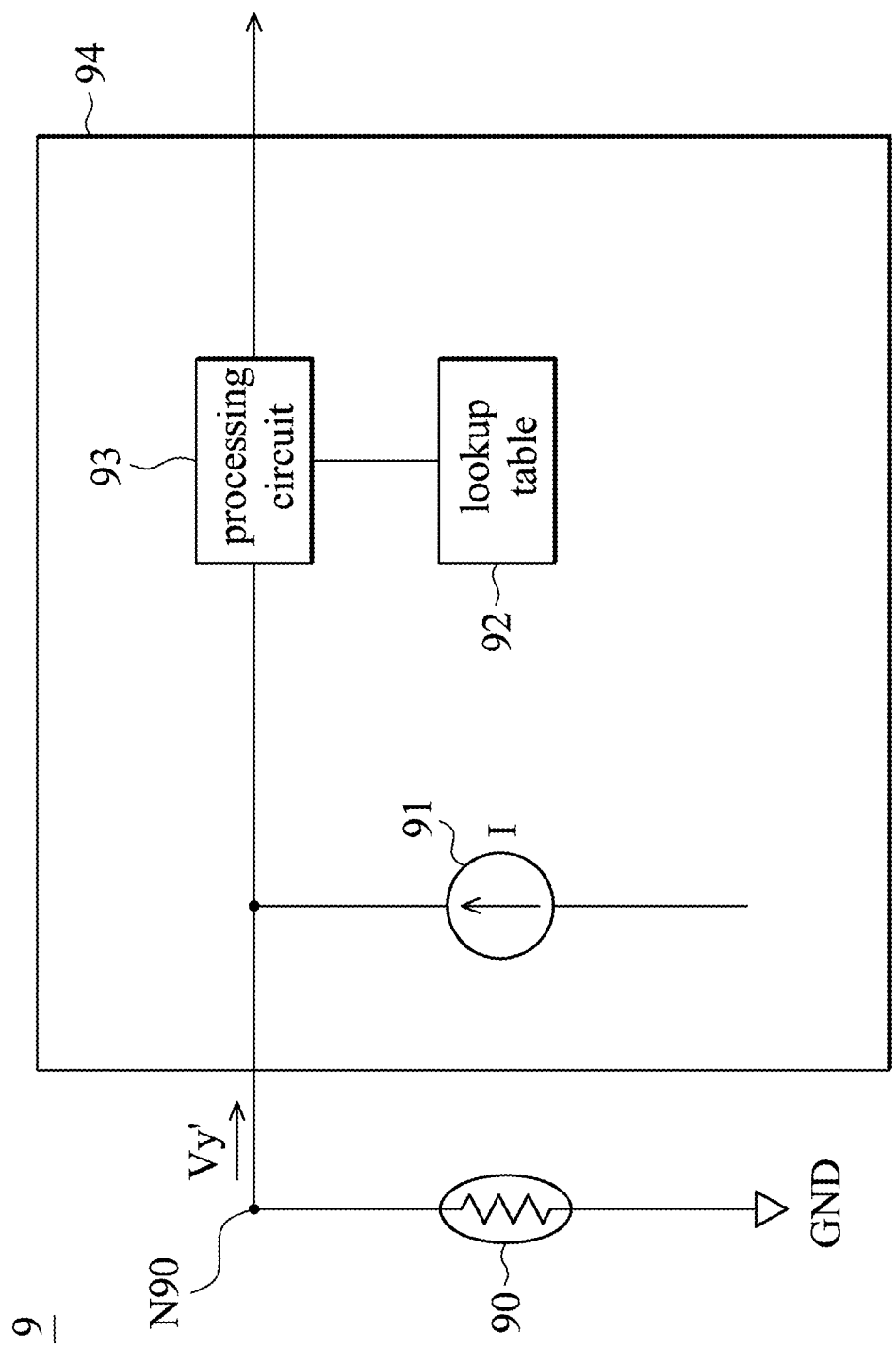
FIG. 9 shows another exemplary embodiment of a temperature measurement device.

FIG. 9 shows another exemplary embodiment of a temperature measurement device. Referring to FIG. 9, a temperature measurement device 9 is used to measure an environment temperature and comprises a thermistor 90, a current source 91, a lookup table 92, and a processing circuit 93. The temperature measurement device 9 can measure an environment temperature of an optical pickup unit 111 in an optical disc drive 110 in FIG. 11. The thermistor 90 is coupled between a node N90 and a ground GND. The impedance value of the thermistor 90 varies with variation of the environment temperature according to the characteristic of the thermistor 90. The current source 91 provides a current to the node N90. The current provided by current source 91 can be a constant current. In the embodiment, the current source 91, the lookup table 92, and the processing circuit 93 are integrated into an integrated circuit (IC). In other words, the current source 91, the lookup table 92, and the processing circuit 93 are in a single chip 94.

At a specific environment temperature point, the thermistor 90 has a specific impedance value R90. A measurement value signal Vy' is generated at the node N90 according to the specific impedance value R90 of the thermistor 90 and the current of the current source 91. The processing circuit 93 is coupled to the node N90 for receiving the measurement value signal Vy'. In the embodiment, the lookup table 92 stores a plurality of temperature values corresponding to various signal magnitudes. Thus, according to the magnitude of the measurement value signal Vy', the processing circuit 93 looks up one temperature value of the temperature values from the lookup table 92 to serve as a value of the specific environment temperature point.

Figure 10A:
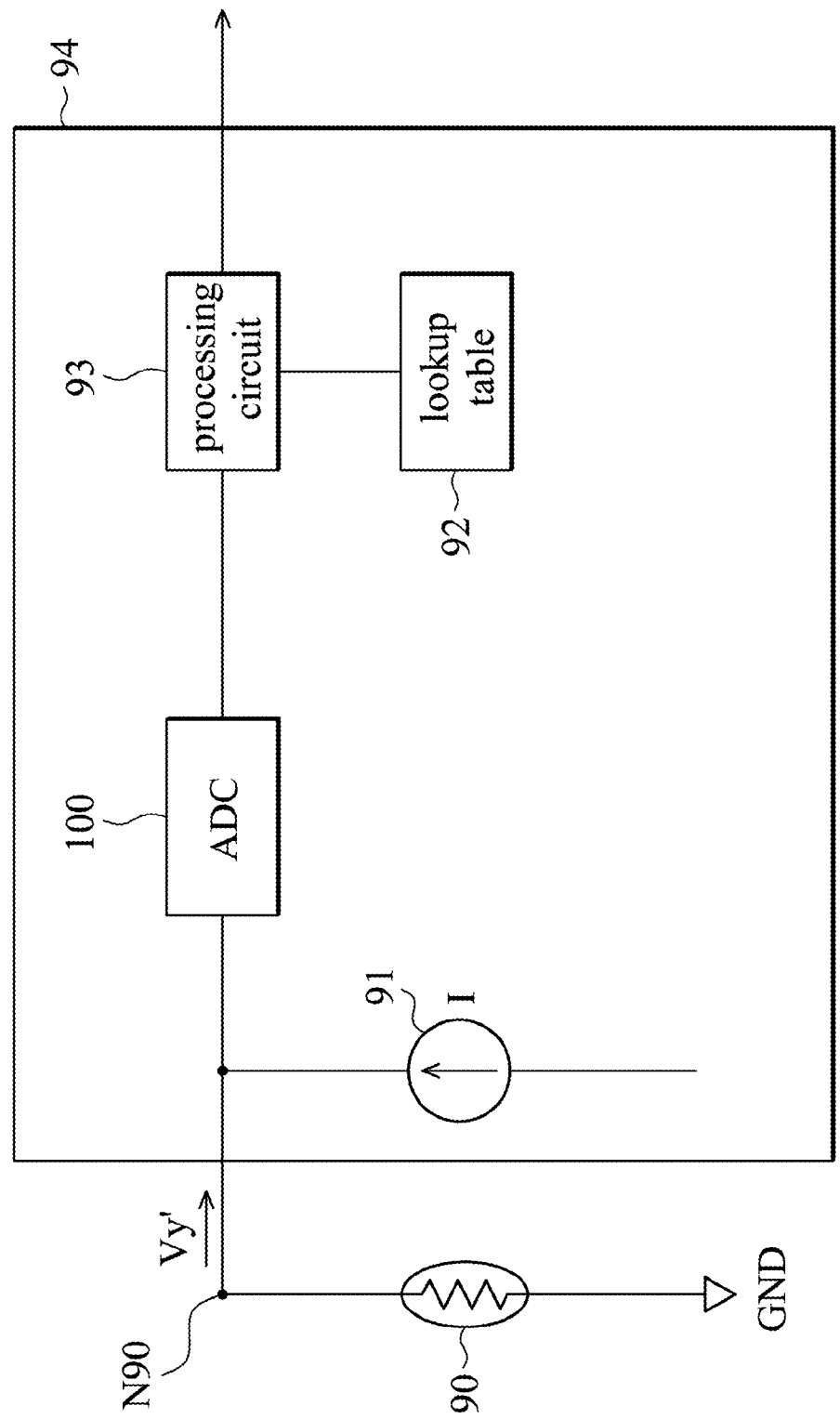
FIGS. 10A-10O show other exemplary embodiments of a temperature measurement device.

In some embodiments, the temperature measurement device 9 further comprises an analog-to-digital conversion (ADC) circuit. As shown in FIG. 10A, an ADC circuit 100 is coupled between the node N90 and the processing circuit 93. The ADC circuit 100 receives the measurement value signal Vy' generated at the specific environment temperature point and digitizes the measurement value signal Vy'. The ADC circuit 100 then outputs the digitized measurement value signal Vy' to the processing circuit 93 to look up the value of the specific environment temperature point from the lookup table 92 in a digital manner. In the embodiment of FIG. 10A, the ADC circuit 100 is in the chip 94.

Figure 10B:
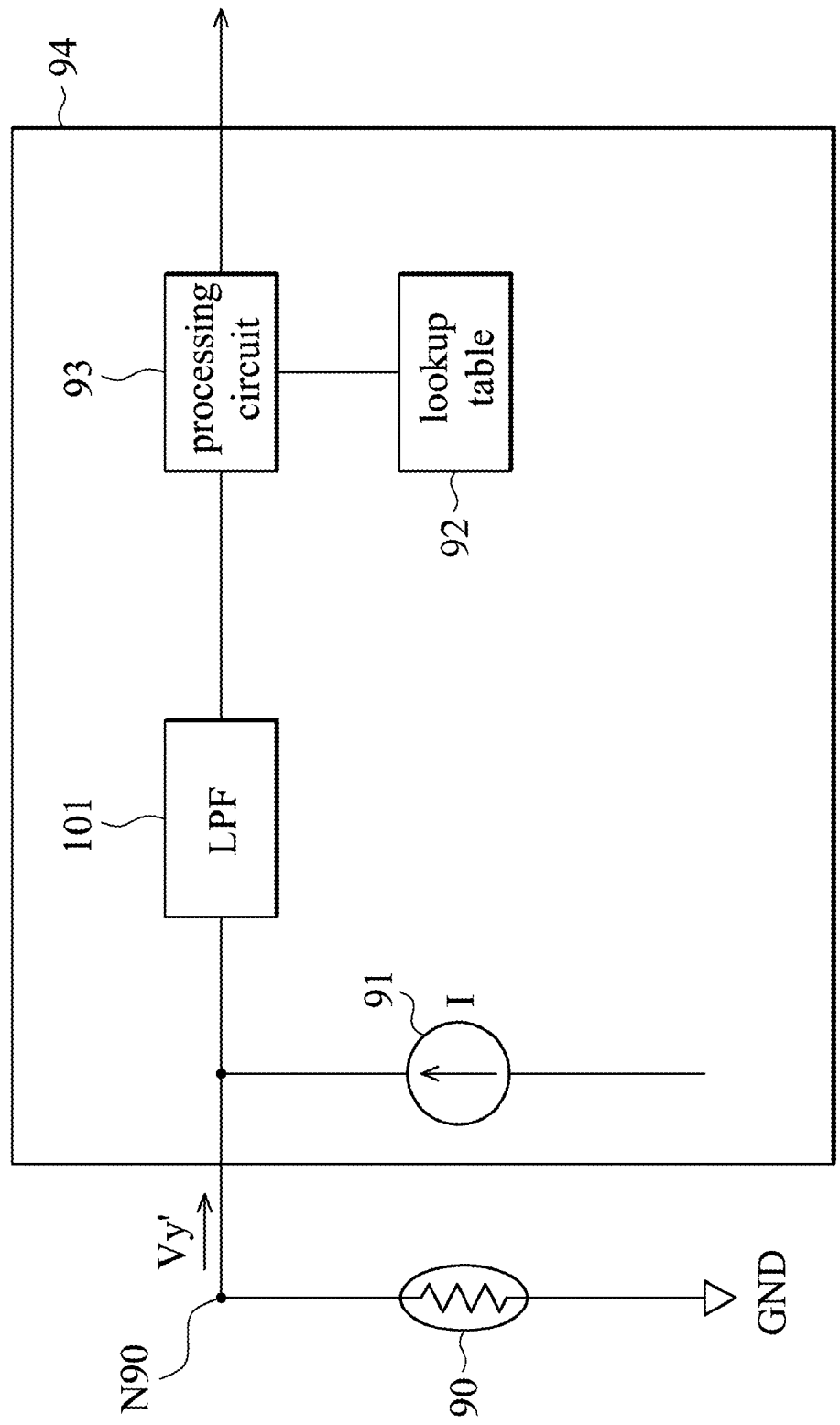

In other some embodiments, the temperature measurement device 9 further comprises a low pass filter (LPF) circuit. As shown in FIG. 10B, an LPF circuit 101 is coupled between the node N90 and the processing circuit 93. The LPF circuit 101 receives the measurement value signal Vy' generated at the specific environment temperature point and filters the measurement value signal Vy' by removing high frequency components therein. The LPF circuit 101 then outputs the filtered measurement value signal Vy' to the processing circuit 93 to more accurately obtain the value of the specific environment temperature point from the lookup table 92. In the embodiment of FIG. 10B, the LPF circuit 101 is in the chip 94.

Figure 10C:
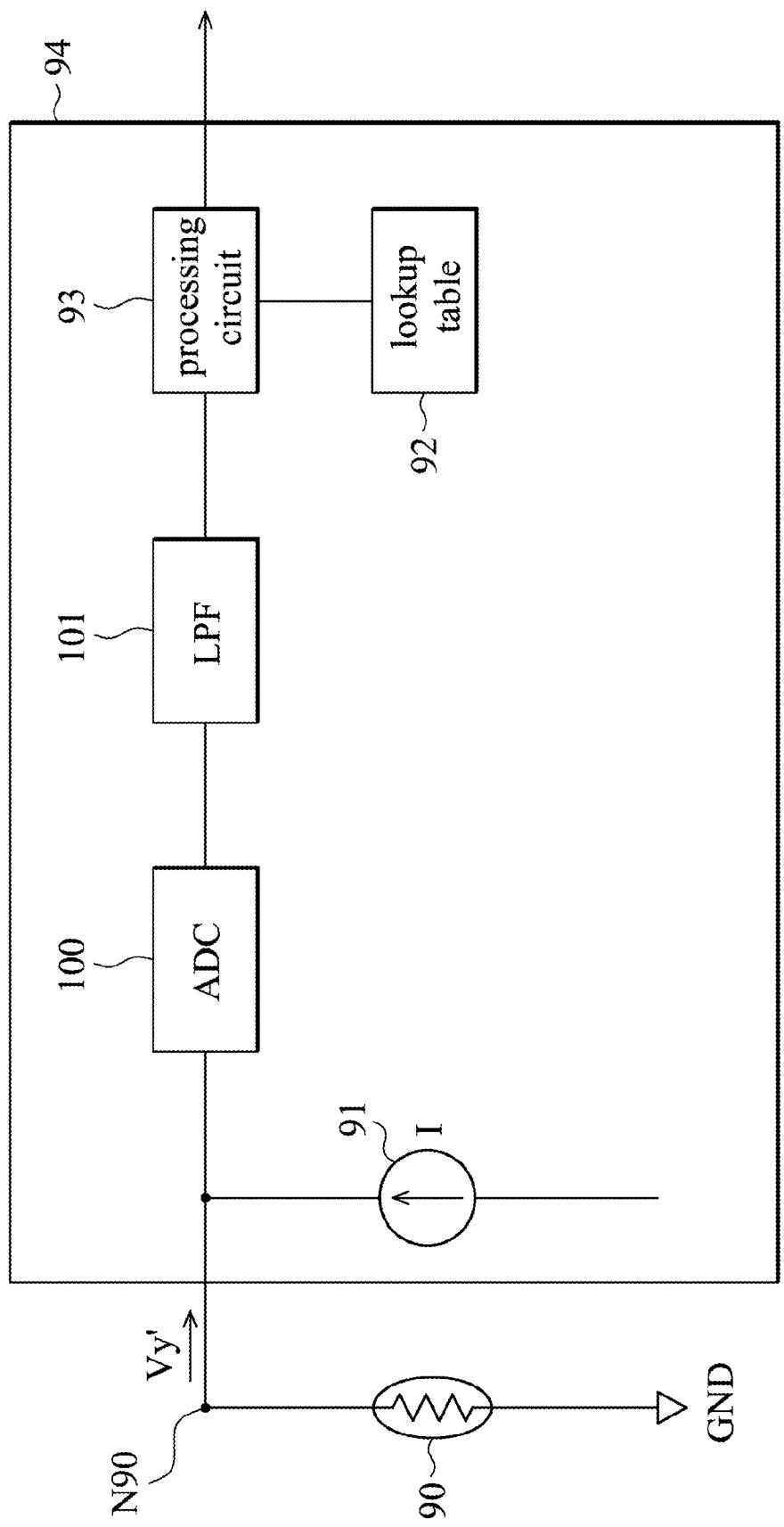

In some other embodiments, the measurement value signal Vy' can be digitized and filtered and then provided to the processing circuit 93. As shown in FIG. 10C, the ADC circuit 100 is coupled to the node N90 to receive and digitize the measurement value signal Vy'. The LPF circuit 101 is coupled to the ADC circuit 100 to receive and filter the digitized measurement value signal Vy'. The processing circuit 93 receives the digitized and filtered measurement value signal Vy' to look up the value of the specific environment temperature point from the lookup table 92. The order of the ADC circuit 100, the LPF circuit 101 and the measurement circuit 93 is not limited to the embodiment shown in FIG. 10C. For example, the measurement value signal Vy' can be filtered and then digitized. In the embodiment of FIG. 10C, the ADC circuit 100 and the LPF circuit 101 are in the chip 94.

It should be noted that, though the thermistor 20/90 is coupled to GND and the resistor 21 is coupled to VDD in the embodiments above, the thermistor 20/90 and the resistor 21 can be coupled to any other voltages according to design requirements. In the embodiments above, the temperature measurement devices 2 and 9 may be applied in optical disc drives to measure the environment temperature of optical pickup units in the optical disc drives. Accordingly, the optical disc drives may adjust operation parameters according to the variation of the environment temperature, so that the optical disc drives can record data on and/or read data from discs more accurately in different environment temperatures.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A temperature measurement device for measuring an environment temperature comprising:
   a thermistor, coupled to a first node, having a specific impedance value at a specific environment temperature point;
   a resistor, having a first terminal coupled to the first node;
   a determination circuit for obtaining a real impedance value of the resistor, wherein the real impedance value of the resistor is affected by process variation and the real impedance value of the resistor is different from a theoretical impedance value of the resistor; and
   a measurement circuit, coupled to the first node, for receiving the real impedance value of the resistor from the determination circuit, receiving a voltage measurement value signal generated at the first node, and obtaining a value of the specific environment temperature point according to the voltage measurement value signal and the real impedance value of the resistor,
   wherein the resistor has the theoretical impedance value, and the measurement circuit obtains the value of the specific environment temperature point according to the voltage measurement value signal, the real impedance value and the theoretical impedance value of the resistor.

2. The temperature measurement device as claimed in claim 1, wherein the measurement circuit comprises a compensation unit for determining an offset and/or a gain of the voltage measurement value signal according to the real impedance value of the resistor and compensating the voltage measurement value signal by the offset and/or the gain to obtain the value of the specific environment temperature point.

3. The temperature measurement device as claimed in claim 1, wherein the measurement circuit comprises:
   a lookup table for storing a plurality of temperature values corresponding to various signal magnitudes and various impedance values; and
   a processing unit for receiving the real impedance value of the resistor from the determination circuit, looking up one temperature value of the temperature values from the lookup table according to a magnitude of the voltage measurement value signal and the real impedance value of the resistor, wherein the temperature value stored in the lookup table which corresponds to the magnitude of the voltage measurement value signal and the real impedance value of the resistor serves as the value of the specific environment temperature point.

4. The temperature measurement device as claimed in claim 1, wherein the determination circuit comprises:
   a current source for providing a current to the resistor; and
   a calculation unit, coupled to a first terminal and a second terminal of the resistor, for detecting a first voltage of the first terminal of the resistor and detecting a second voltage of the second terminal of the resistor;
   wherein the calculation unit calculates the real impedance value of the resistor according to the current, the first voltage, and the second voltage.

5. The temperature measurement device as claimed in claim 4, wherein the determination circuit further comprises:
a first analog-to-digital conversion unit, coupled to the first terminal of the resistor, for digitizing the first voltage and outputting the digitized first voltage to the calculation unit; and
a second analog-to-digital conversion unit, coupled to the second terminal of the resistor, for digitizing the second voltage and outputting the digitized second voltage to the calculation unit.

6. The temperature measurement device as claimed in claim 1 further comprising an analog-to-digital conversion circuit, coupled to the first node, for receiving the voltage measurement value signal, digitizing the voltage measurement value signal, and outputting the digitized voltage measurement value signal to the measurement circuit.

7. The temperature measurement device as claimed in claim 6, wherein the resistor, the determination circuit, the measurement circuit, and the analog-to-digital conversion unit are in a same chip.

8. The temperature measurement device as claimed in claim 1 further comprising a low pass filter circuit, coupled to the first node, for receiving the voltage measurement value signal, filtering the voltage measurement value signal, and outputting the filtered voltage measurement value signal to the measurement circuit.

9. The temperature measurement device as claimed in claim 8, wherein the resistor, the determination circuit, the measurement circuit, and the low pass filter circuit are in a same chip.

10. The temperature measurement device as claimed in claim 1, wherein the resistor, the determination circuit, and the measurement circuit are in a same chip.

11. The temperature measurement device as claimed in claim 1, wherein the temperature measurement device measures an environment temperature of an optical pickup unit in an optical disc drive.

12. A temperature measurement device for measuring an environment temperature comprising:
a thermistor, coupled to a first node, having a specific impedance value at a specific environment temperature point;
a resistor, having a first terminal coupled to the first node;
a determination circuit for obtaining a real impedance value of the resistor; and
a measurement circuit, coupled to the first node, for receiving the real impedance value of the resistor from the determination circuit, receiving a voltage measurement value signal generated at the first node, and obtaining a value of the specific environment temperature point according to the voltage measurement value signal and the real impedance value of the resistor, and
wherein the resistor has a theoretical impedance value, and the measurement circuit obtains the value of the specific environment temperature point according to the voltage measurement value signal, the real impedance value and the theoretical impedance value of the resistor.

13. A temperature measurement device for measuring an environment temperature comprising:
a thermistor, coupled to a first node, having a specific impedance value at a specific environment temperature point;
a resistor, having a first terminal coupled to the first node;
a determination circuit for obtaining a real impedance value of the resistor, wherein the real impedance value of the resistor is affected by process variation and the real impedance value of the resistor is different from a theoretical impedance value of the resistor; and
a measurement circuit, coupled to the first node, for receiving the real impedance value of the resistor from the determination circuit, receiving a voltage measurement value signal generated at the first node, and obtaining a value of the specific environment temperature point according to the voltage measurement value signal and the real impedance value of the resistor,
wherein the resistor has a theoretical impedance value and further has a second terminal coupled to a voltage source, and the measurement circuit comprises a calculation unit for calculating the value of the specific environment temperature point by applying the voltage measurement value signal, the real impedance value and the theoretical impedance value of the resistor, and a voltage value of the voltage source in a predetermined formula.

* * * * *